United States Patent
Schuhmacher et al.

[11] Patent Number: 6,156,866
[45] Date of Patent: Dec. 5, 2000

[54] CHIRAL NEMATIC POLYCARBONATES

[75] Inventors: Peter Schuhmacher, Mannheim; Hans R. Kricheldorf, Hamburg, both of Germany; Shih-Jieh Sun, Taipei, Taiwan

[73] Assignee: BASF Aktiengesellschaft, Ludwigshafen, Germany

[21] Appl. No.: 09/147,636

[22] PCT Filed: Aug. 5, 1997

[86] PCT No.: PCT/EP97/04266

§ 371 Date: Feb. 5, 1999

§ 102(e) Date: Feb. 5, 1999

[87] PCT Pub. No.: WO98/05698

PCT Pub. Date: Feb. 12, 1998

[30] Foreign Application Priority Data

Aug. 5, 1996 [DE] Germany .................... 196 31 658

[51] Int. Cl.⁷ .................................................. C08G 64/00
[52] U.S. Cl. ........................................ 528/196; 528/198
[58] Field of Search .................................. 528/196, 198

[56] References Cited

PUBLICATIONS

S. Vilasagar et al. Journal, Polymer Sci., Polym. Phys. Ed. 20 (5) pp. 877–892, 1982.
Baessler et al., Journal Chem. Phys. vol. 52; 631, 1970.
Kricheldorf et al., Macromolecules vol. 23, 2656, 1990.

*Primary Examiner*—Terressa M. Boykin
*Attorney, Agent, or Firm*—Oblon, Spivak, McClelland, Maier & Neustadt, P.C.

[57] ABSTRACT

A chiral nematic polycarbonate having carbonate units, of the formula I
where the w/x/y/z molar ratio is 1 to 20/1 to 5/0 to 10/0 to 10, A is a mesogenic group of the formula

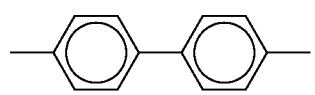

or

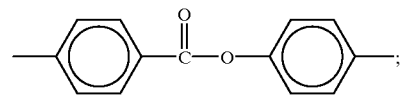

; and B is a chiral group.

11 Claims, No Drawings

CHIRAL NEMATIC POLYCARBONATES

BACKGROUND OF THE INVENTION

1. Field of the Invention

The invention relates to liquid crystalline chiral nematic polycarbonates.

2. Description of the Background

Heating of shape-anisotropic substances may result in liquid crystalline phases, called mesophases. The individual phases differ by the spatial arrangement of the molecular centers on the one hand and by the molecular arrangement with respect to the long axes on the other hand (G. W. Gray, P. A. Winsor, Liquid Crystals and Plastic Crystals, Ellis Horwood Limited, Chichester 1974). The nematic liquid crystalline phase is distinguished by parallel orientation of the long axes of the molecule (one-dimensional order state). Provided that the molecules forming the nematic phase are chiral, what results is a chiral nematic (cholesteric) phase in which the long axes of the molecules form a helical superstructure perpendicular thereto (H. Baessler, Festkörperprobleme XI, 1971). The chiral moiety may either be present in the liquid crystalline molecule itself or be added as doping substance to the nematic phase, in which case the chiral nematic phase is induced. This phenomenon was investigated first on cholesterol derivatives (for example H. Baessler, M. M. Labes, *J. Chem. Phys.* 52 (1970) 631)).

The chiral nematic phase has special optical properties: a high optical rotation and a pronounced circular dichroism which arises owing to selective reflection of circularly polarized light within the chiral nematic layer. The different colors which are apparent depending on the angle of view depend on the pitch of the helical superstructure which in turn depends on the twisting ability of the chiral component. It is moreover possible to alter the pitch, and thus the wavelength range of the selectively reflected light, of a chiral nematic layer in particular by changing the concentration of a chiral doping substance. Chiral nematic systems of this type have interesting possibilities for practical application. Thus, it is possible by incorporating chiral moieties into mesogenic acrylic esters and orienting in the chiral nematic phase, eg. after photopolymerization, to prepare a stable colored network, although it is not then possible to change its concentration of chiral component (G. Galli, M. Laus, A. Angelon, *Makromol. Chemie* 187 (1986) 2289). It is possible by admixing noncrosslinkable chiral compounds with nematic acrylic esters and by photopolymerization to prepare a colored polymer which still contains large amounts of soluble components (I. Heyndricks, D. J. Broer, *Mol. Cryst. Liq. Cryst.* 203 (1991) 113). It is furthermore possible by random hydrosilylation of mixtures of cholesterol derivatives and acrylate-containing mesogens with defined cyclic siloxanes and subsequent photopolymerization to obtain a chiral nematic network in which the chiral component may comprise up to 50% of the material employed; however, these polymers still contain marked amounts of soluble materials (F. H. Kreuzer, R. Mauerer, Ch. Müller-Rees, J. Stohrer, Presentation No. 7, 22nd meeting on liquid crystals, Freiburg, 1993).

DE-A-35 35 547 describes a process in which a mixture of cholesterol-containing monoacrylates can be converted by photopolymerization into chiral nematic layers. However, the total content of the chiral component in the mixture is about 94%. Although the mechanical stability of such a material as pure side-chain polymer is not very great, the stability can be increased only by highly crosslinking diluents.

Numerous chiral nematic polyesters in which the mesogenic structures are incorporated into the main chain are also generally known, eg. from S. Vilasagar, A. Blumstein, *Mol. Cryst. Liq. Cryst.* (1980), 56 (8), 263–9; A. Blumstein, S. Vilasagar, S. Ponratham, S. B. Clough, R. B. Blumstein, G. Maret, *J. Polym. Sci., Polym. Phys. Ed.* (1982), 20 (5), 877–92; E. Chiellini, G. Galli, C. Malanga, N. Spassky, *Polym. Bull.* (1983), 9 (6–7), 336–43; H. J. Park, J. I. Jin, R. W. Leng, *Polymer* (1985), 26 (9), 1301–6; J. I. Jin, E. J. Choi, K. Y. Lee, *Polym. J.* (1986), 18 (1), 99.101; J. I. Jin, S. C. Lee, S. D. Chi, J. H. Chang; *Pollimo* (1986), 10 (4), 382–8; J. I. Jin, E. J. Choi, B. W. Jo, *Pollimo* (1986), 10 (6), 635–40; J. M. G. Cowie, E. H. Wu, *Makromol. Chem.* (1988), 189 (7), 1511–16; V. V. Zuev, I. G. Denisov, S. S. Skorokhodov, *Vysokomol. Soedin., Ser. A* (1989, 31 (5), 1056–61; A. S. Angeloni, D. Caretti, C. Carlini, E. Chiellini, G. Galli, A. Altomare, R. Solaro, M. Laus, *Liq. Cryst.* (1986), 4 (5), 513–27; K. Fujishiro, R. W. Lenz, *Macromolecules* (1992), 25 (1), 88–95; K. Fujishiro, R. W. Lenz, *Macromolecules* (1992), 25 (1), 81–7; V. V. Zuev, I. G. Denisov, S. S. Skorokhodov, *Vysokomol. Soedin., Ser. B* (1992), 34 (3), 47–54; V. V. Zuev, I. G. Denisov, S. S. Skorokhodov *Vysokomol. Soedin., Ser. B* (1989), 31 (2), 130–2.

These polyesters usually show narrow ranges of existence of the chiral nematic phase and contain predominantly open-chain chiral components which have little twisting ability so that relatively large contents of these components are necessary in order to obtain a color. This means that the choice of the remaining polyester constituents is restricted, for example with respect to their mechanical properties.

DE-A-19504913.6 describes chiral nematic polyesters with chiral diol components which have a strong twisting effect, in particular dianhydride saccharides, and with wide liquid crystalline phase ranges.

EP-A-682 092 describes surface coatings based on chiral nematic polymers. The examples mentioned are exclusively polyesters prepared by polycondensation of dicarboxylic acids and diols. Polycarbonates are not mentioned.

Chiral nematic polycarbonates have not hitherto been disclosed. The carbonate group is, because of its nonlinear structure, less suitable than the ester group for stabilizing a liquid crystalline phase. Nevertheless, it has been possible to prepare aromatic polycarbonates which contain para-linked diphenols, in particular 4,4'-dihydroxybiphenyl (DHB), and are able to form a nematic phase over a wide temperature range (Kricheldorf, H. R.; Lübbers, D., Makromol. Rapid Communc. 1989, 10, 383; Kricheldorf, H. R.; Lübbers, D., Macromolecules 1990, 23, 2656; Sun, S.-J.; Chang, TzCh., J. Polym. Sci., Part A, Polym. Chem. 1993, 31, 2237). However, there are problems in using chiral comonomers because they destabilize the liquid crystalline phase of polycarbonates more strongly than do their nonchiral analogs.

SUMMARY OF THE INVENTION

The invention relates to chiral nematic polycarbonates having carbonate units which comprise a mesogenic group, and carbonate units which comprise a chiral group, and to chiral nematic polycarbonates which additionally comprise carbonate units having a photoreactive group and/or carbonate units having another, nonchiral group which is, in particular, a mesogenic and/or solubility-improving group. Said units are groups which can be derived from diols by removing the two hydroxyl groups. They are therefore also referred to as diol units hereinafter.

DETAILED DESCRIPTION OF THE PREFERRED EMBODIMENTS

The chiral nematic polycarbonates according to the invention preferably correspond to formula I

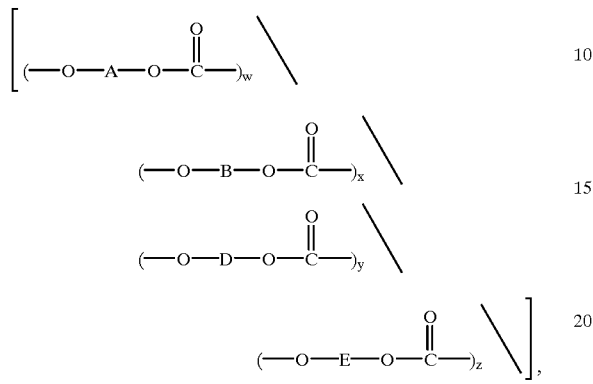

where the w/X/y/z molar ratio is about 1 to 20 / about 1 to 5 / about 0 to 10 / about 0 to 10. A w/x/y/z molar ratio of about 1 to 5 / about 1 to 2 / about 0 to 5 / about 0 to 5 is particularly preferred.

In formula I,

A is a mesogenic group of the formula

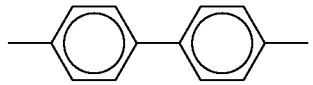

or

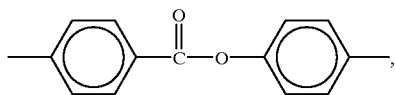

B is a chiral group of the formula

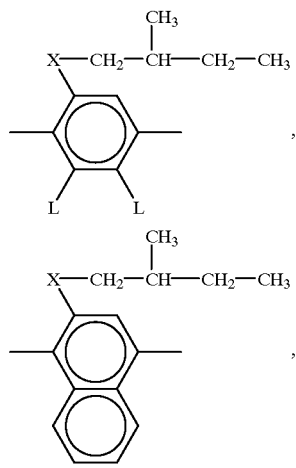

-continued

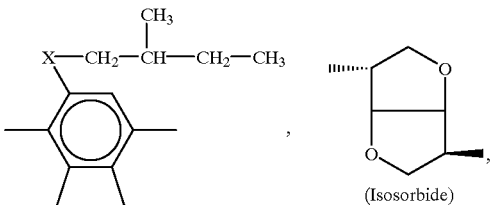

(Isosorbide)

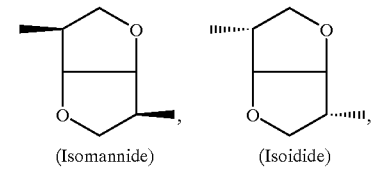

(Isomannide)   (Isoidide)

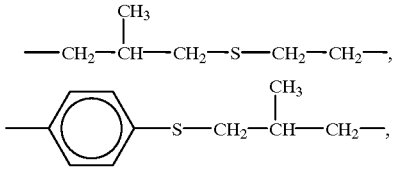

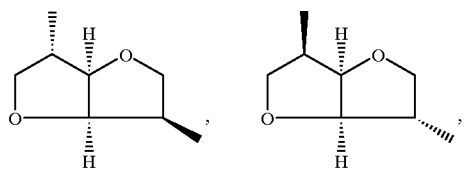

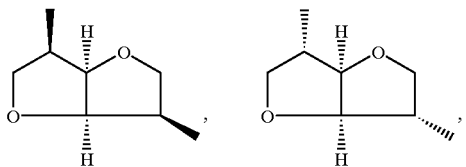

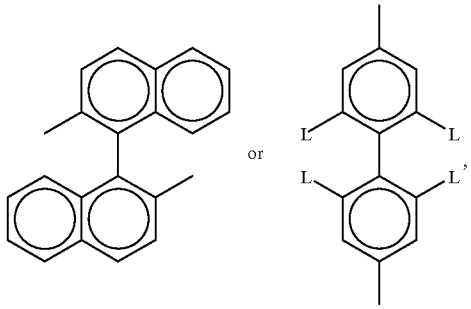

or

D is a photoreactive group of the formula

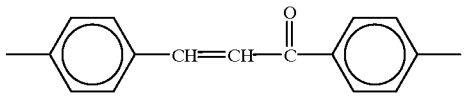

or

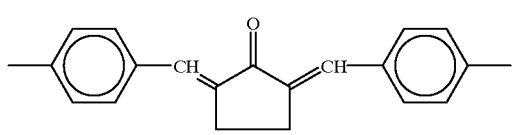

and

E is another, nonchiral group of the formula

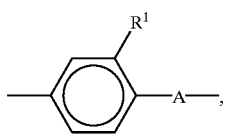

where, in the above formulae,

L is alkyl, alkoxy, halogen, COOR, OCOR, CONHR or NHCOR,

X is S, O, N, $CH_2$ or a single bond,

R is alkyl or hydrogen,

A is a single bond, $(CH_2)_n$, $O(CH_2)_n$, $S(CH_2)_n$, $NR(CH_2)_n$,

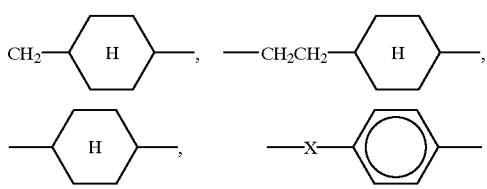

or

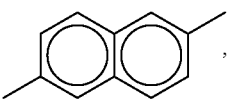

$R^1$ is hydrogen, halogen, alkyl or phenyl, and n is an integer from 1 to 15.

When $R^1$ is alkyl, halogen and A is a single bond, or when $R^1$ is H or alkyl and A is

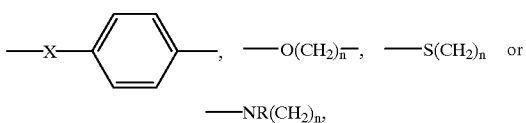

the groups improve the solubility. Examples thereof are

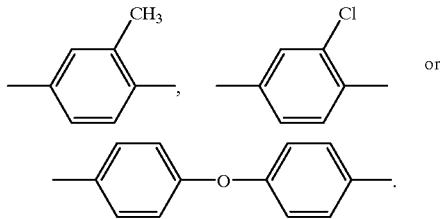

Isosorbide, isomannide and/or isoidide is the preferred chiral component.

Saccharide derivatives based on dianhydrosorbide and the stereoisomers thereof are distinguished by a very great twisting ability. It is possible by suitable choice of the ratio between the chiral diol and a nonchiral diol, preferably phenylhydroquinone, to stabilize the liquid crystalline phase ranges to above 450° C.

The content of chiral diol structural units is preferably in the range from 1 to 80 mol % of the total content of diol structural units, particularly preferably 2 to 20 mol %, depending on the interference hue required.

The following abbreviations apply for the purpose of the present application:

4,4'-dihydroxybiphenyl: DHB; methylhydroquinone: MHQ;

4,4'-dihydroxychalcone: DHC; hydroquinone 4-hydroxybenzoate: HQHB; 2,5-bis(4-hydroxybenzylidene)cyclopentanone: BHBC.

Alkyl (also in alkoxy etc.) is preferably $C_1$–$C_6$-alkyl, in particular $C_1$–$C_4$-alkyl, such as methyl, ethyl, n-propyl, isopropyl, n-butyl, isobutyl, sec-butyl, tert-butyl, n-pentyl and n-hexyl.

Hal is F, Cl, Br and I.

The polycarbonates according to the invention can be prepared by various types of polycondensation of diols with phosgene or diphosgene. Examples of diols which can be employed are the terminally hydroxylated groups A, B, D and E in formula I. They are employed in the A/B/D/E molar ratio ≈1 to 20/1 to 5/0 to 10/0 to 10, particularly preferably in the A/B/D/E molar ratio ≈1 to 5/1 to 2/0 to 5/0 to 5. Examples of conventional types of polycondensation are interfacial polycondensation, melt polycondensation and solution polycondensation.

In interfacial polycondensation, the diols forming the mesogenic group, the chiral group and, where appropriate, the photoreactive and the solubility-improving group are dissolved together with phosgene or, preferably, the considerably less hazardous diphosgene (Cl—$COCCl_3$) or triphosgene and a catalytic amount of an amine, for example triethylamine or a quaternary ammonium salt such as triethylbenzylammonium chloride, in a suitable organic solvent, eg. an ether such as tetrahydrofuran or dioxane, a chlorinated hydrocarbon such as dichloromethane or chlorobenzene. An aqueous base, eg. sodium hydroxide solution, is added to this solution, and the two phases are mixed together, eg. by vigorous stirring. The stirring is preferably accompanied by cooling. If the polymer is soluble in the solvent used, the organic phase is separated off and the polycarbonate is isolated therefrom in a conventional way, eg. by taking up in methanol and filtering off. If, on the other hand, the polymer precipitates from the solvent or a gel is formed, the reaction mixture is diluted if necessary, eg. with methanol, and the polymer is filtered off. It is also possible to employ as alternatives to phosgene or diphosgene the chlorinated carbonic diesters of the diols to be condensed.

In melt polycondensation, the dicarbonate of one of the diols forming the mesogenic group, the chiral group and, where appropriate, the solubility-improving or the photoreactive group is reacted with the diols forming the remaining groups. The reaction is carried out at elevated temperature, generally in the range from 120° C. to 300° C., it also being possible for the temperature to be increased stepwise in this range. The resulting polymer is dissolved or suspended in one of the abovementioned suitable solvents and, where appropriate, precipitated with methanol.

In solution polycondensation, the diols forming the mesogenic group, the chiral group and, where appropriate, the other nonchiral group and the photoreactive group are dissolved in an amine, preferably a tertiary or aromatic amine, for example pyridine. Diphosgene dissolved in one of the abovementioned suitable solvents is added to this solution. The reaction is generally carried out at from about 0° C. to ambient temperature, but the temperature can also be higher, in particular in order to complete the reaction. The mixture is then worked up in a conventional way. The chlorinated carbonic diesters of the diols to be polymerized can also be used, as alternative to the use of diphosgene, in the solution polycondensation.

Of the condensation methods mentioned, interfacial polycondensation and solution polycondensation are preferred, the latter especially when more hydrophilic monomers, such as isosorbide, are employed, these being transferred from the aqueous into the organic phase considerably less well than the other monomers with which they are to be condensed in the interfacial polycondensation.

If the polycarbonate is required to have a low viscosity, a chain terminator, eg. cinnamoyl chloride, can be added to the reaction mixture.

The polycarbonates according to the invention have an inherent viscosity $\eta_{inh}$ of about 0.08 to 3 dl/g, in particular about 0.1 to 2 dl/g, measured at 20° C. with c=2 g/l in dichloromethane/trifluoroacetic acid (ratio 4/1 by volume).

The glass transition temperature (determined by DSC) of the polycarbonates according to the invention is generally in the range from about 50 to 300° C., in particular about 60 to 200° C. The melting point of the polymers according to the invention is generally in the range from about 75 to 450° C., in particular about 90 to 350° C.

The polycarbonates according to the invention contain randomly distributed units.

The polycarbonates according to the invention are able to form what is called a Grandjean texture, which confirms the cholesteric effect of the chiral groups used.

The polymers according to the invention are particularly suitable as surface-coating materials, as optical components and as chiral nematic coloring materials. They can be used as coloring surface-coating system (eg. as automobile paint or effect sheets), or else for producing colored pigments. The coloring structure of the polymer can be fixed by rapid cooling or photochemical crosslinking of the chiral nematic phase. Colored pigments can be produced, for example, by detaching the oriented polymer film from the coated surface and milling to pigments in the form of small plates. In contrast to the process described in DE-A 42 40 743, in this case crosslinking of the polymer is not absolutely necessary. The polymer can be used as surface-coating system in the form of a powder, a melt or a solution (eg. in N-methylpyrrolidone or dimethylformamide). In the simplest case, the orientation of the system takes place by heat treatment of the coated surface and can be improved, where appropriate, by the action of mechanical, electrical or magnetic forces.

The following Examples illustrate the invention without restricting it, however:

The physical properties of the polymers described in the examples are indicated in Table 1.

EXAMPLE 1

Chiral Nematic Polycarbonate with (S)-(2-methylbutylthio)hydroquinone as Diol Forming the Chiral Group DHB (15 mmol), MHQ (7.5 mmol), (S)—(2-Methylbutylthio)hydroquinone (7.5 mmol), diphosgene (16.5 mmol) and 1 drop of triethylamine were dissolved in 100 ml of dry cold dichloromethane. 80 ml of 1N sodium hydroxide solution were added to this solution, and the two phases were stirred with an Ultra Turrax homogenizer for 10 min and then with a normal mechanical stirrer for 20 min while cooling in ice. The organic phase was then separated off in a separating funnel, added to 800 ml of methanol and filtered. The isolated polymer was dissolved in dichloromethane and reprecipitated in methanol. Finally, the polycarbonate was dried at 80° C. under reduced pressure. The yield from this interfacial polycondensation was 88%. The resulting polymer 1 is described by the following formula:

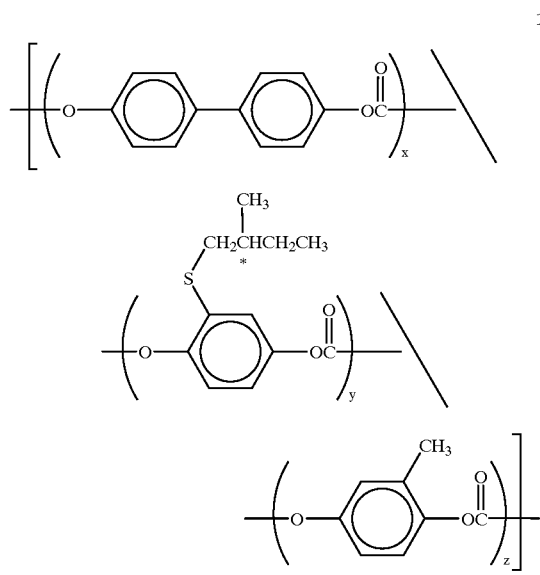

with the x/y/z molar ratio=5/1/4.

EXAMPLE 2

Chiral Nematic Polycarbonate with Isosorbide as Diol Forming the Chiral Group

A solution of diphosgene (16.5 mmol) in 20 ml of dichloromethane was added dropwise to a solution of DHB (15 mmol), MHQ (7.5 mmol) and isosorbide (7.5 mmol) in 30 ml of pyridine. The mixture was left to react at about 5 to 10° C. for 30 min and then at room temperature for about one hour. The mixture was then added to methanol and filtered. The isolated polymer was dissolved in dichloromethane and reprecipitated in methanol. The resulting polycarbonate of the formula 2 with the x/y/z molar ratio= 2/1/1 (2a) was dried at 80° C. under reduced pressure. A second polycarbonate of the formula 2 with the x/y/z molar ratio=4/1/3 (2b) was prepared in the same way but with 3.75 mmol of MHQ and 11.25 mmol of isosorbide.

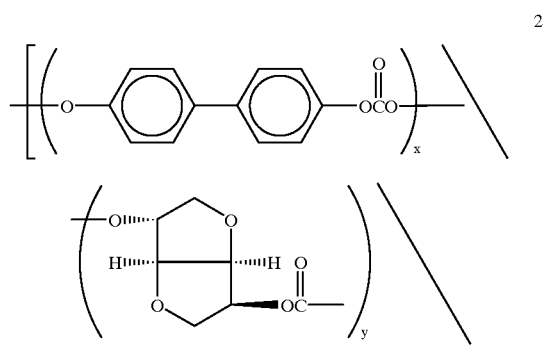

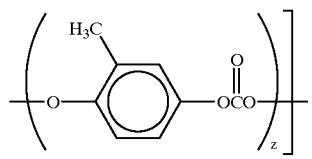

The yield was 98% in both cases.

EXAMPLE 3

Chiral Nematic Polycarbonates with DHC as Photoreactive Group

A solution of diphosgene (16.5 mmol) in dichloromethane (20 ml) was added dropwise to a solution of DHB (15 mmol), DHC (7.5 mmol) and isosorbide (7.5 mmol) in pyridine (30 ml). The reaction mixture was stirred at about 5 to 10° C. while cooling in ice for 30 min and subsequently at about 20 to 25° C. for about 1 h. The reaction mixture was then added to cold methanol, and the precipitated polycarbonate of the formula 3

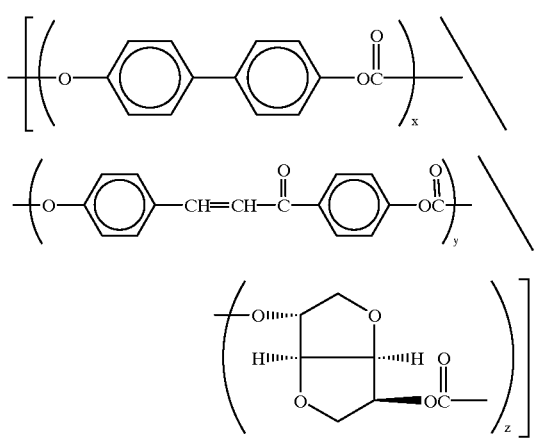

3 with the x/y/z ratio of molar amounts=2/1/1 (3a) was filtered off, washed with methanol and dried at about 80° C. under reduced pressure. Three other polycarbonates with x/y/z molar ratios=3/2/1 (3b), =4/3/1 (3c) and =5/4/1 (3d) were prepared in a similar way. The amounts of DHC and isosorbide used for 3b were 10 mmol and 5 mmol, for 3c were 11.25 mmol and 3.75 mmol and for 3d were 12 mol and 3 mmol, respectively. The yield was 98% for each of 3a–c, and was 97% for 3d. UV radiation of thin films of the polycarbonates 3a to 3d with UV from a mercury vapor lamp for 5 minutes rendered the polymers insoluble in dichloromethane. DHC is thus also suitable as crosslinker unit in chiral nematic polycarbonates.

EXAMPLE 4

Chiral Nematic Polycarbonates with HQHB as Diol Forming the Mesogenic Group

A solution of diphosgene (16.5 mmol) in 20 ml of dichloromethane was added dropwise to a solution of HQHB (15 mmol), DHC (7.5 mmol) and isosorbide (7.5 mmol) in 30 ml of pyridine. The mixture was left to react at about 5 to 10° C. for about 30 min and then at room temperature for about one hour. The mixture was then taken up in methanol, and the precipitated polycarbonate of the formula 4

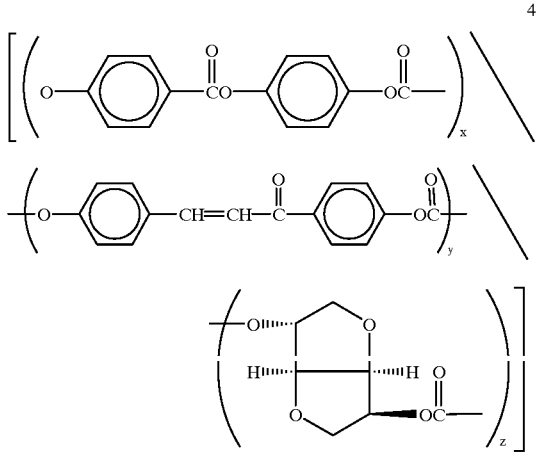

4 with the x/y/z molar ratio=2/1/1 (4a) was filtered off and dried at about 80° C. under reduced pressure. Three other polycarbonates with x/y/z molar ratios=3/2/1 (4b), =4/3/1 (4c) and =5/4/1 (4d) were prepared in a similar way. The amounts of DHC and isosorbide used for 4b were 10 mmol and 5 mmol, for 4c were 11.25 mmol and 3.75 mmol and for 4d were 12 mmol and 3 mmol, respectively. The yields were 94% for polycarbonate 4a, 93% for 4b and 96% for each of 4c and 4d.

EXAMPLE 5

Chiral Nematic Polycarbonates with BHBC as Crosslinker Unit

A solution of diphosgene (16.5 mmol) in 20 ml of dichloromethane was added dropwise to a solution of HQHB (10 mmol), BHBC (10 mmol) and isosorbide (10 mmol) in 30 ml of pyridine. The mixture was left to react at about 5 to 10° C. for about 30 min and then at room temperature for about one hour. The mixture was then added to methanol and filtered. The resulting polymer of the formula 5

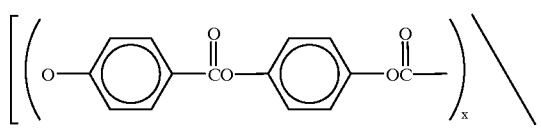

5

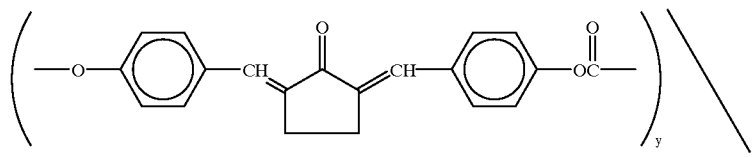

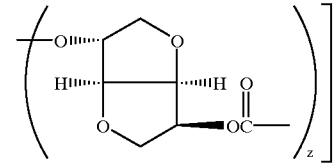

with the x/y/z molar ratios=1/1/1 (5a) was dissolved in dichloromethane and reprecipitated in methanol. Finally, the polycarbonate was dried at about 80° C. under reduced pressure. Three other polycarbonates of the formula 5 were prepared in the same way. The x/y/z molar ratios were 2/1/1 for 5b, 3/2/1 for 5c and 4/3/1 for 5d. The amounts of HQHB, BHBC and isosorbide employed were 15 mmol, 7.5 mmol and 7.5 mmol for 5b, 15 mmol, 10 mmol and 5 mmol for 5c and 15 mmol, 11.25 mmol and 3.75 mmol for 5d. The yield was 84% for 5a, 91% for 5b, 79% for 5c and 90% for 5d.

Table 1 indicates the physical properties (inherent viscosity ($\eta_{inh}$), optical rotation ($[\alpha]_D$), glass transition temperature ($T_g$) and clearing point ($T_i$)), the observed textures of the liquid crystalline phases and the interference colors of polymers 1 to 5.

TABLE 1

| Poly- and oligo-mer | $\eta_{inh}$[1] (dl/g) | $[\alpha]_D$[2] [degrees] | $T_g$[3] (° C.) | $T_i$[4] (° C.) | Texture | Color |
|---|---|---|---|---|---|---|
| 1 | 1.48 | −1.2 | 115 | >300 | Grandjean | bluish |
| 2a | 0.68 | +43 | 121 | >340[z] | Grandjean | bluish |
| 2b | 0.86 | +28 | −(?) | >360[z] | Grandjean | bluish |
| 3a | 0.50 | +41.6 | 116 | >340[z] | Grandjean | bluish |
| 3b | 0.38 | +33.0 | 118 | >340[z] | Grandjean | bluish |
| 3c | 0.40 | +21.1 | 116 | >350[z] | Grandjean | bluish |
| 3d | 0.33 | +19.6 | 111 | >350[z] | Grandjean | bluish |
| 4a | 0.27 | +38.7* | 104 | 290–325 | Grandjean | blue in reflected light, yellowish-orange in transmitted light |
| 4b | 0.50 | +30.3* | 102 | 280–300 | Grandjean | blue |
| 4c | 0.62 | +23.5* | 101 | 310–330 | Grandjean | blue |
| 4d | 0.66 | +17.1* | 101 | 325–>350 | Grandjean | blue |
| 5a | 0.58 | | 146 | >310[z)v)] | Grandjean | bluish |
| 5b | 0.47 | | 126 | >315[z)v)] | Grandjean | bluish |
| 5c | 0.45 | | 146 | >330[z)v)] | Grandjean | bluish |
| 5d | 0.88 | | 135 | >320[z)v)] | Grandjean | bluish |

TABLE 1-continued

| Poly- and oligo-mer | $\eta_{inh}$[1] (dl/g) | $[\alpha]_D$[2] [degrees] | $T_g$[3] (° C.) | $T_i$[4] (° C.) | Texture | Color |
|---|---|---|---|---|---|---|

[1] measured at 20° C., c = 2 g/l in dichloromethane/trifluoroacetic acid (4/1)
[2] measured at 25° C., c = 5 g/l or *2 g/l in dichloromethane/trifluoroacetic acid (4/1)
[3] DSC measurement, heating rate 20° C./min
[4] Polarizing microscope, heating rate 10° C./min or #optical microscope, heating rate 20° C./min
[z] thermal decomposition
[v] thermal crosslinking

We claim:

1. A chiral nematic polycarbonate having carbonate units, of the formula I

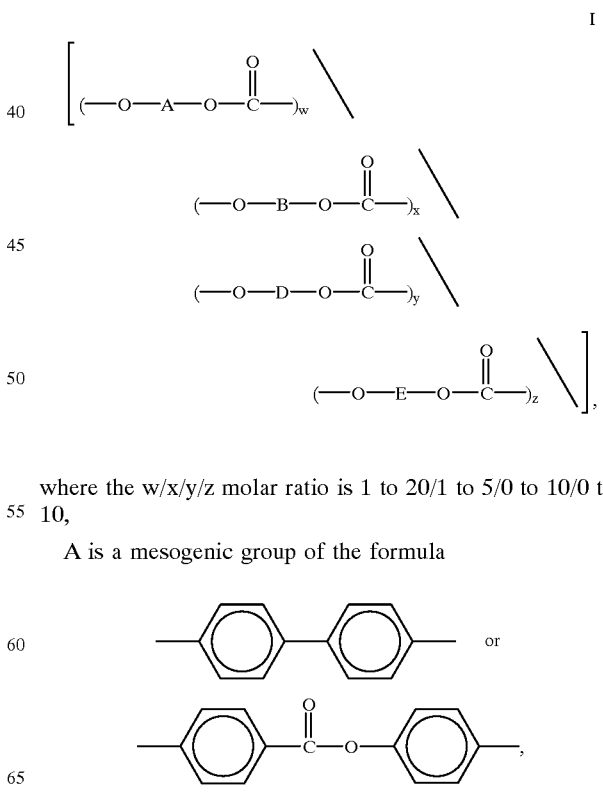

where the w/x/y/z molar ratio is 1 to 20/1 to 5/0 to 10/0 to 10,

A is a mesogenic group of the formula

B is a chiral group of the formula
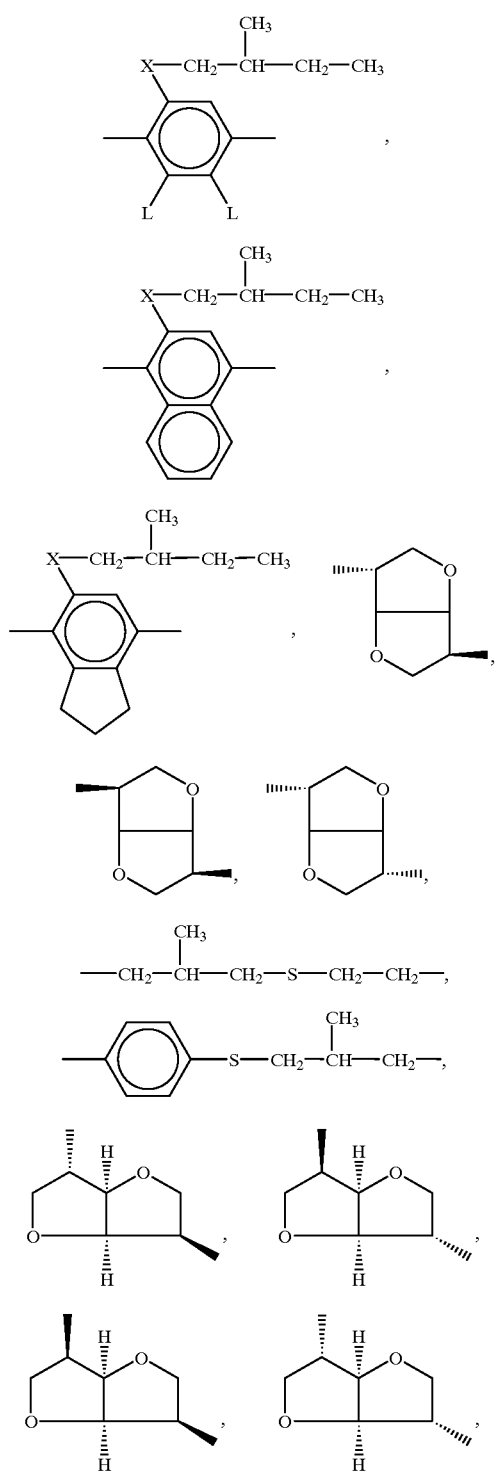
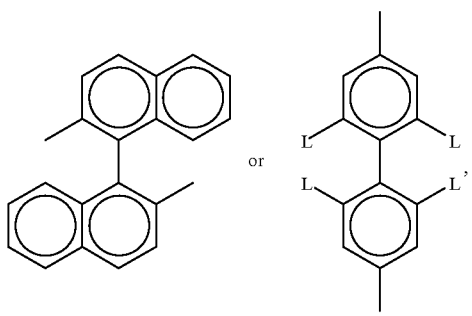
D is a photoreactive group of the formula
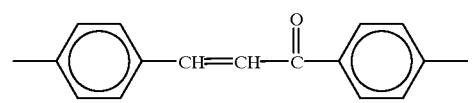
or
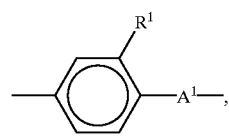
and
E is another, nonchiral group of the formula
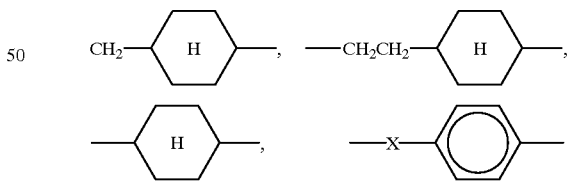
where, in the above formulae
L is alkyl, alkoxy, halogen, COOR, OCOR, CONHR or NHCOR,
X is S, O, N, $CH_2$ or a single bond,
R is alkyl or hydrogen,
$A^1$ is a single bond, $(CH_2)_n$, $O(CH_2)_n$, $S(CH_2)_n$, $NR(CH_2)_n$,
or $R^1$ is hydrogen, halogen, alkyl or phenyl, and n is an integer from 1 to 15.

2. The chiral nematic polycarbonate as claimed in claim 1, which has an inherent viscosity of about 0.08 to 3 dl/g, measured in dichloromethane/trifluoroacetic acid (4:1, v/v) at 20° C. and at a concentration of 2 g/l.

3. The chiral nematic polycarbonate of claim 1, which has a glass transition temperature in the range from about 50 to 300° C.

4. A pigment comprising a chiral nematic polycarbonate of claim 1.

5. A coating composition comprising at least one chiral nematic polycarbonate of claim 1.

6. The process as claimed in claim 1, wherein cinnamoyl chloride is added as chain terminator.

7. A process for preparing chiral neumatic polycarbonates, which comprises condensing compounds containing the mesogenic groups and chiral groups of claim 1, and, optionally, photoreactive groups or solubility-improving groups or thermally crosslinking groups or a combination thereof, each in the form of a corresponding diol compounds, with phosgene or diphosgene.

8. The chiral nematic polycarbonate as claimed in claim 1, which has an inherent viscosity $\eta_{inh}$ of about 0.08 to 3 dl/g measured at 20° C. with c=2 g/l in dichloromethane/trifluoroacetic acid (ratio 4/1 by volume).

9. The chiral nematic polycarbonate as claimed in claim 8, having an inherent viscosity of 0.1 to 2 dl/g.

10. The chiral nematic polycarbonate as claimed in claim 1, which has a glass transition temperature of from about 50° C. to 300° C.

11. The chiral nematic polycarbonate as claimed in claim 1, which has a melting point of from about 75° C. to 450° C.

* * * * *